(12) United States Patent
Hailpern et al.

(10) Patent No.: US 6,948,116 B2
(45) Date of Patent: Sep. 20, 2005

(54) SYSTEM AND METHOD FOR CREATING A UNIFIED PRINTABLE COLLECTION OF HYPERLINKED DOCUMENTS

(75) Inventors: Brent Tzion Hailpern, Katonah, NY (US); Yoelle Maarek, Haifa (IL); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 09/727,897

(22) Filed: Dec. 1, 2000

(65) Prior Publication Data

US 2002/0069229 A1 Jun. 6, 2002

(51) Int. Cl.[7] ................................................. G06F 3/00
(52) U.S. Cl. ................................. 715/501.1; 715/514
(58) Field of Search ............................. 715/500, 501.1, 715/513, 514, 515, 526, 527

(56) References Cited

U.S. PATENT DOCUMENTS

| | | | | | |
|---|---|---|---|---|---|
| 5,781,914 A | * | 7/1998 | Stork et al. | ................... | 715/506 |
| 5,848,413 A | * | 12/1998 | Wolff | ......................... | 707/10 |
| 5,867,799 A | * | 2/1999 | Lang et al. | ..................... | 707/1 |
| 5,870,552 A | * | 2/1999 | Dozier et al. | ................ | 709/219 |
| 5,895,470 A | * | 4/1999 | Pirolli et al. | ................. | 707/102 |
| 6,237,011 B1 | * | 5/2001 | Ferguson et al. | ........... | 715/515 |
| 6,393,469 B1 | * | 5/2002 | Dozier et al. | ................ | 709/219 |
| 6,415,278 B1 | * | 7/2002 | Sweet et al. | .................... | 707/2 |
| 6,507,410 B1 | * | 1/2003 | Robertson et al. | ......... | 358/1.18 |
| 6,601,075 B1 | * | 7/2003 | Huang et al. | ............ | 707/104.1 |
| 6,650,434 B1 | * | 11/2003 | Bruce | ........................ | 358/1.18 |
| 6,728,000 B1 | * | 4/2004 | Lapstun et al. | ............ | 358/1.15 |
| 2002/0129058 A1 | * | 9/2002 | Story et al. | ................. | 707/513 |

* cited by examiner

Primary Examiner—Stephen Hong
Assistant Examiner—Gregory J. Vaughn
(74) Attorney, Agent, or Firm—F. Chau & Associates, LLC

(57) ABSTRACT

The present invention relates to a method for creating a meta-document. The method collects at least one hyperlinked document based on a seed document and cross-references the documents within the collection. Cross-referencing includes resolving an anchor and an object, and indexing the resolved anchor and object based on respective locations within a meta-document. The method organizes the collected documents and seed documents. The method also publishes the meta-document including the cross-referenced documents. Preferably, the method of collecting includes accepting the seed document having an anchor pointing to an object, and adding a document containing the object to the collection. In addition, collecting includes the step of manually modifying the collection. The meta-document is a collection of the seed document and the hyperlinked document. Further, the index is one of a footnote, an end note, a table of contents, and an appendix.

17 Claims, 9 Drawing Sheets

Organization routine

SYSTEM AND METHOD FOR CREATING A UNIFIED PRINTABLE COLLECTION OF HYPERLINKED DOCUMENTS

BACKGROUND OF THE INVENTION

1. Field of the Invention

The present invention relates generally to a system and method of creating a collection of documents, and more particularly to publishing a collection of hyperlinked documents as one cohesive document.

2. Description of Prior Art

The proliferation of information on the World Wide Web (WWW) has made the task of grouping related information difficult. Hyperlinks are typically used within on-line documents to provide access to related information. A hyperlink, or link, is a connection from one object (e.g., word, image, sound, and/or video) to another, which can be selected by a user. Typically, a link is a highlighted word or picture, which when selected, results in the immediate delivery of another file. The highlighted object is referred to as an anchor. An anchor reference and the corresponding object constitute a basic hyperlink.

Hyperlinks provide quick and easy access to electronic documents, however, they can lose functionality when transferred to other mediums, for example, when an on-line document is printed as a hard-copy (i.e., paper). The functionality of any hyperlink is lost, that is, the hyperlink can no longer navigate a user to readily available related information.

In some Web browsers, such as MICROSOFT'S® Internet Explorer, when printing an on-line document, an option is provided for printing all linked documents. The browser then prints each document independently, with only a table including shortcut text to Internet addresses attached.

Therefore, a need exists for a system and method of collecting and publishing a collection of hyperlinked documents as an integrated document. Furthermore, as most information is now available on the Web in the form of Web pages including hyperlinks, there is a need for a method of compiling a publication from an initial set (seed) of hyperlinked documents.

SUMMARY OF THE INVENTION

The present invention relates to a method for creating a meta-document. The method collects at least one hyperlinked document based on a seed document and cross-references the documents within the collection. Cross-referencing includes resolving an anchor and an object, and referencing the anchor and the object based on respective locations within a meta-document.

The method organizes the collected documents and the seed documents The method also publishes the meta-document including the cross-referenced documents.

Preferably, the method of collecting includes accepting the seed document having the anchor pointing to the object, and adding a document including the object to the collection. In addition, collecting includes the step of manually modifying the collection.

The meta-document is a collection of the seed document and the hyperlinked document. Further, the referencing step includes providing one of a footnote, an end note, a table of contents, and an appendix to either the anchor or and the object.

The method further includes representing each hyperlink (e.g., highlighted word) as a dimension of a corresponding document, determining a frequency of each hyperlink, defining hyperlink frequency as a coordinate on a corresponding hyperlink dimension, and clustering each document as a vector. The method also includes ordering the collection breadth-first. Alternatively, the method includes ordering the collection depth-first.

Alternatively, organizing may include defining a document with the largest number of connections as an anchor of a first level. The method may define any document pointed to by the anchor and pointing to the anchor as a first level node, and may order the first level nodes based on the number of nodes each first level node points to. The method may define at least a second level including documents pointed to by the first level and not yet pointed to by another node. The method preferably completes the organization upon determining that all documents are assigned a level. If there are unassigned documents, the method may define a document with the largest number of connections as an anchor of a first level upon determining that no document was assigned to a last defined level. The method defines an additional level including documents pointed to by a next higher level and not yet pointed to by another node upon determining that a document was assigned to a last defined level.

Publishing may include one of, printing, storing (e.g., on removable disk, hard drive, in memory, etc.), faxing, and e-mailing.

The above methods for creating a meta-document may be implemented in a computer readable program code.

According to an embodiment of the present invention, a method of publishing a meta-document may include receiving a user request at a publisher, collecting at least one hyperlinked document based on the user request, cross-referencing the documents with the collection, and publishing the collection to the user. The user request may include one of an electronic request, a verbal request, and a written request.

The method may further include determining the copyright information of a collected document, and compensating the copyright holder for the use of the document.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A system and method according to the present invention are provided for collecting hyperlinked documents, integrating these documents as one cohesive unit or meta-document and providing cross references for corresponding hyperlinks (i.e., anchors and objects) within the meta-document.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

In one embodiment of the present invention, hyperlinked documents are collected and compiled from at least one initial document. This initial document is called a seed. A seed document serves as the basis for growing a larger document. Specifically, an organization or structure is created for a meta-document stemming from the seed document. The organization is provided by resolving cross referenced hyperlinks within the meta-document.

Figure 1:
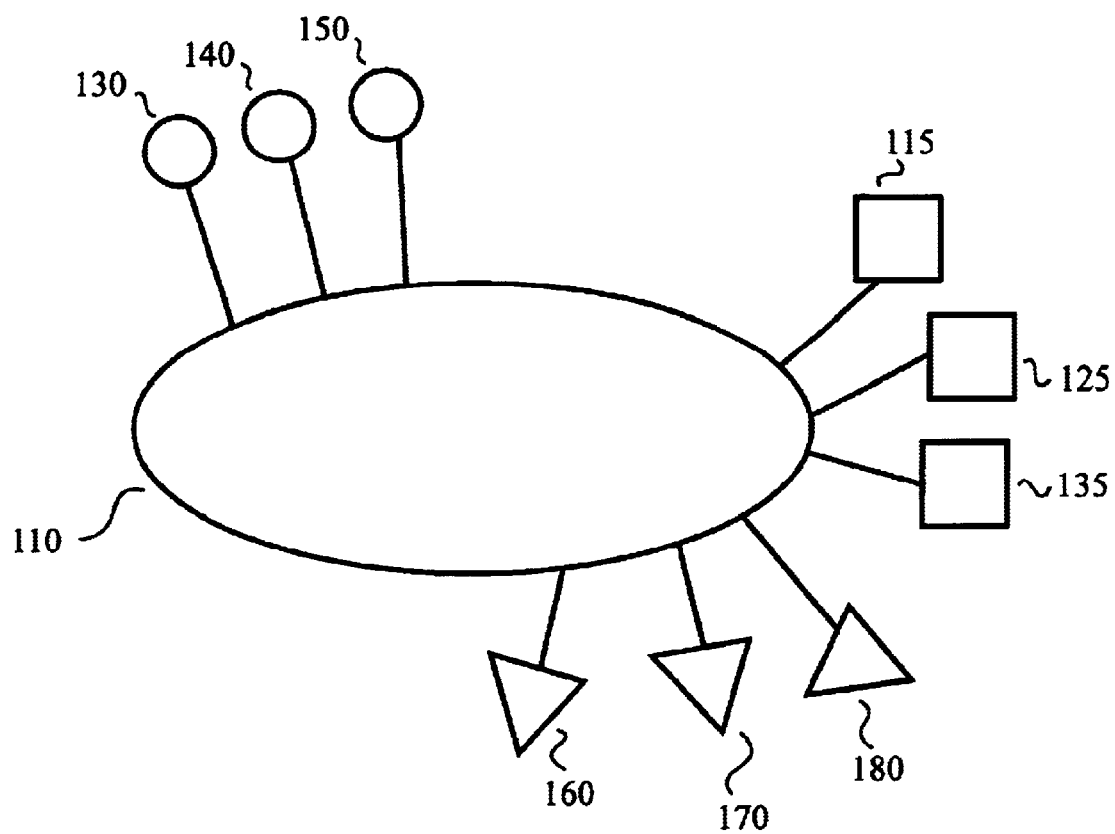
FIG. 1 is a diagram of a network environment in accordance with the present invention.

Referring to FIG. 1, in a system according to the present invention, client stations 115, 125, and 135, are connected to a network 110. In addition, Web servers 130, 140, and 150, having Web sties are connected to the network. Client stations can configure their browsers to go through a proxy server (i.e., 160, 170 or 180) to access the various Web servers 130, 140 and 150, having Web sites.

Figure 2:
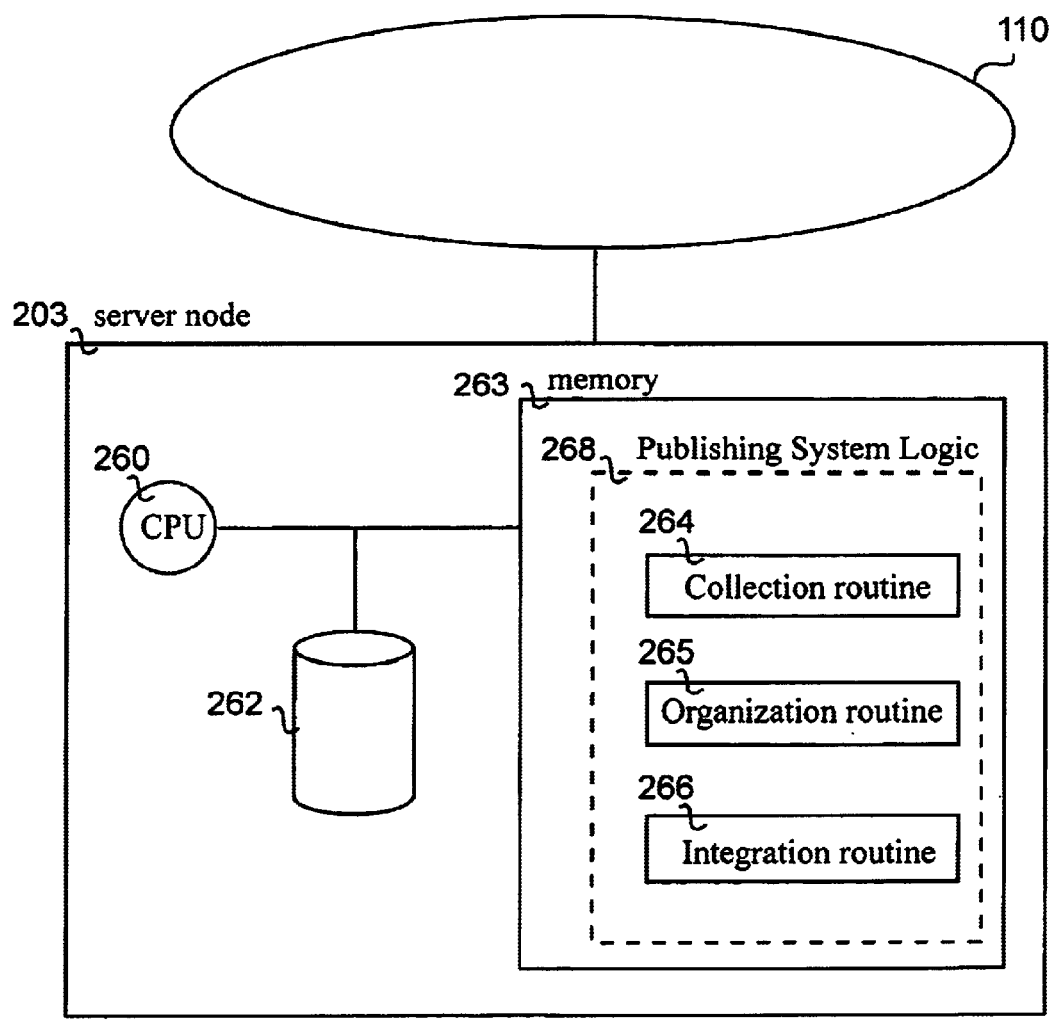
FIG. 2 is a block diagram of an architecture of an integrated publishing system according to the present invention.

Referring now to FIG. 2, a diagram of a publishing system is shown according to the present invention. A publishing system node/server node 203 can access the network 110. The publishing system node/server node 203 preferably includes a CPU 260, a memory 263 such as a random access memory (RAM), and storage devices 262 such as direct access storage devices (DASD). The memory 263 stores the publishing system logic 268 (depicted in FIG. 3), preferably embodied as computer executable code loaded from a DASD 262 into memory 263 for execution by the CPU 260. The publishing system logic 268 includes a document collection routine 264 (depicted in FIG. 4), an organization routine 265 (depicted in FIG. 6), and an integration routine 266 (depicted in FIG. 8). The publishing system node/server node 203 can be a client workstation or implemented as a separate server node on the Web.

Figure 3:
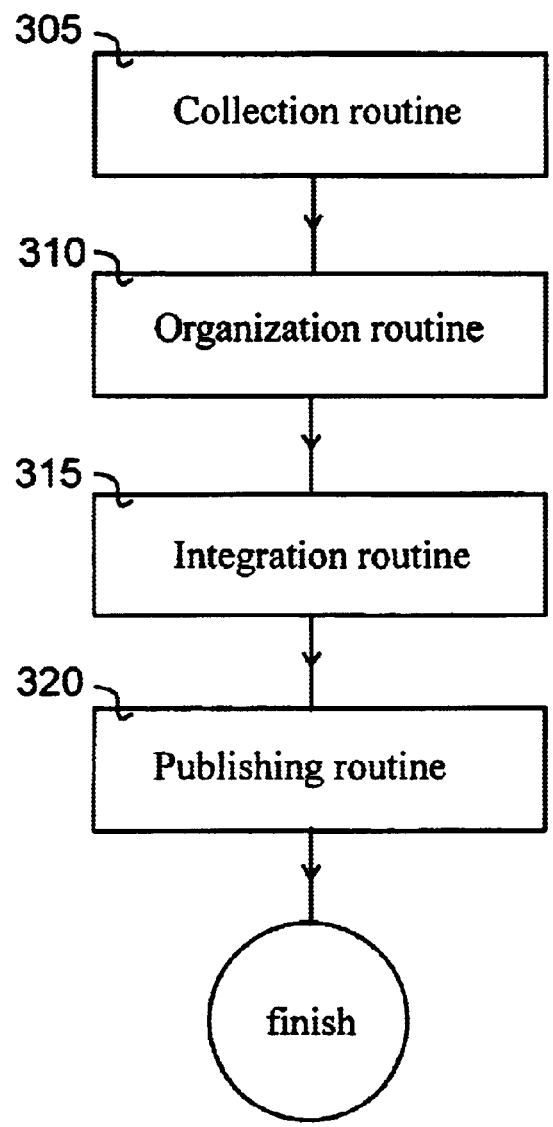
FIG. 3 is a flow chart of the publishing system logic of FIG. 2.

Referring to FIG. 3, the collection routine 264 is invoked to create a collection of hyperlinked documents based on at least one initial seed document provided by a user 305. Typical examples of hyperlinked documents include, for example, Web pages spread over the various Web sites (130–150). Another example includes independently published academic articles with bibliographies. The organization routine 265 is invoked to create an organization or structure for the document collection 310. This can include hierarchical sub-collections, for example, chapters and sections. The integration routine 266 is invoked to resolve cross-referencing within the collection 315. If a hyperlink or anchor in one document points to an object in another document in the collection, a footnote or other similar mechanism will be associated with the anchor to point to, for example, the page number or chapter corresponding to the object.

The publishing routine is invoked to process the integrated document 320. The publishing routine creates the final (printed or printable) output as specified by the user. The publishing routine can create a printed hard copy or publish the content in another medium, for example, a writing to a CD-ROM. The system and method can also deliver a fax document or printable electronic document (e.g., in Lotus WORD PRO or Portable Document Format (pdf), etc.).

Figure 4:
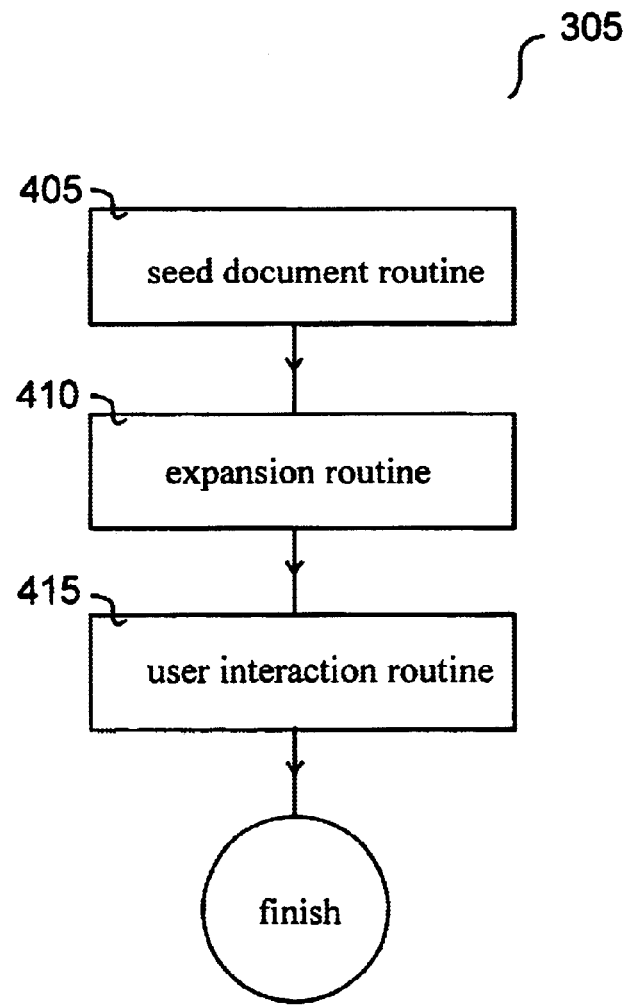
FIG. 4 is a flow chart of a document collection routine according to an embodiment of the present invention.
Figure 5:
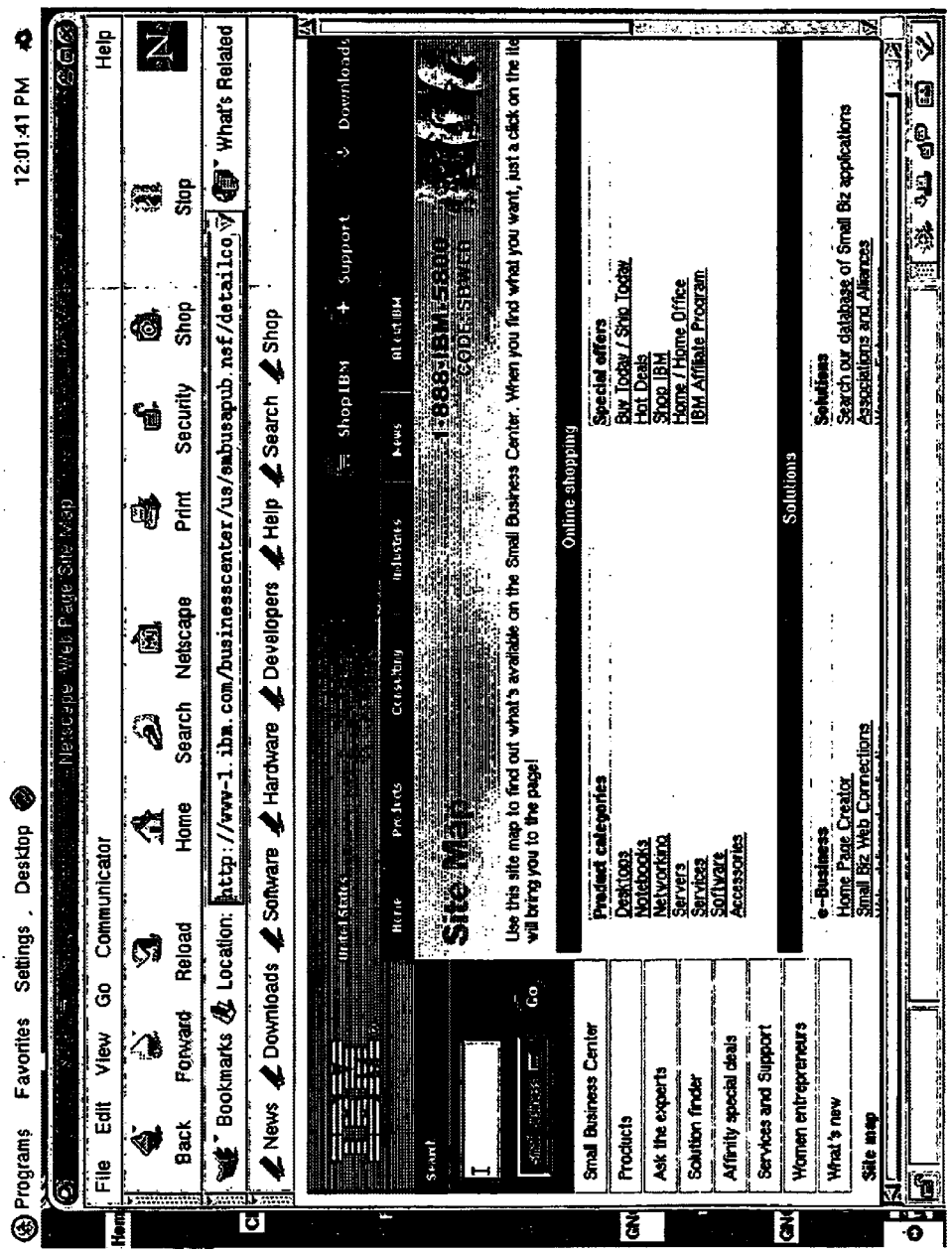
FIG. 5 is an illustrative site map for a Web site in accordance with the present invention.

According to FIG. 4, a seed document routine is invoked where the routine collects at least one initial seed or core hyperlinked document from the user 405. One of ordinary skill in the art will recognize, in light of the present invention, that there are alternative ways of collecting the seed document(s), for example, by letting the user provide the name or URL of each of these documents directly. Alternatively, a graphical user interface can be provided to allow a user to select the seed document(s) from a graphical user interface (GUI). For example, one can use a site-map interface (e.g., FIG. 5) to allow the user to select a document subset of a Web site from its site map. An expansion routine is used to add additional documents to the collection 410. This is done by fetching the documents in the seed collection specified by the user. These documents can be located locally and/or distributed across a network, for example, the Internet. The system and method identifies the hyperlinks embedded in each document and adds these referenced documents (e.g., those pointed to by the URLs embedded in a Web page as anchors) into the collection. The present invention contemplates different implementations of the above system and method.

According to an embodiment of the present invention, a user can define stopping criteria for the expansion. One criterion is the distance from the seed documents. For example, a maximum distance of two means that only the documents directly referenced (or pointed to via the hyperlink) by a seed document and the documents referenced by those documents (directly referenced by the seed documents) will be included in the collection. Another example of a stopping criteria is a reference count. For example, a minimum reference count of two means that a document has to be referenced by at least two of the seed documents to be included in the collection. Other constraints can include the source for the documents (e.g., Web site, server, proxy, etc.), the date of publication (including the last time the document was modified), the size of the document, etc.

After the collection is expanded from the initial seed document(s), a user interaction routine can be invoked to allow the user to browse through the collection and delete any undesirable documents 415. The user can also repeat the collection process to compile more documents. For example, the user can modify the stopping criteria or add additional seed documents and repeat the expansion routine to obtain a new set of results.

One skilled in the art will recognize, in light of the present invention, that there are other stopping criteria for the expansion routine, for example, age of a document (stop at old documents), ratings of a document (for example, as provided by Platform for Internet Content Selection (PICS), a method for providing meta information concerning electronic content), importance of a page (for example, identifying the hubs/authority pages in a collection, where authority pages are authorities on a topic and hub pages point to many pages relevant to the topic, as discussed in the paper by S. Chakrabarti, et al., "Automatic Resource Compilation by Analyzing Hyperlink Structure and Associated Text", Computer Networks and ISDN Systems, Vol. 30, April 1998), size of page (avoiding large pages, or not counting short pages).

Those skilled in the art can also see that there are different ways to create or obtain the seed document(s). One alternative is to collect seed documents based on past history of use of an individual or a group, for example, from a web browser's history cache.

Figure 6:
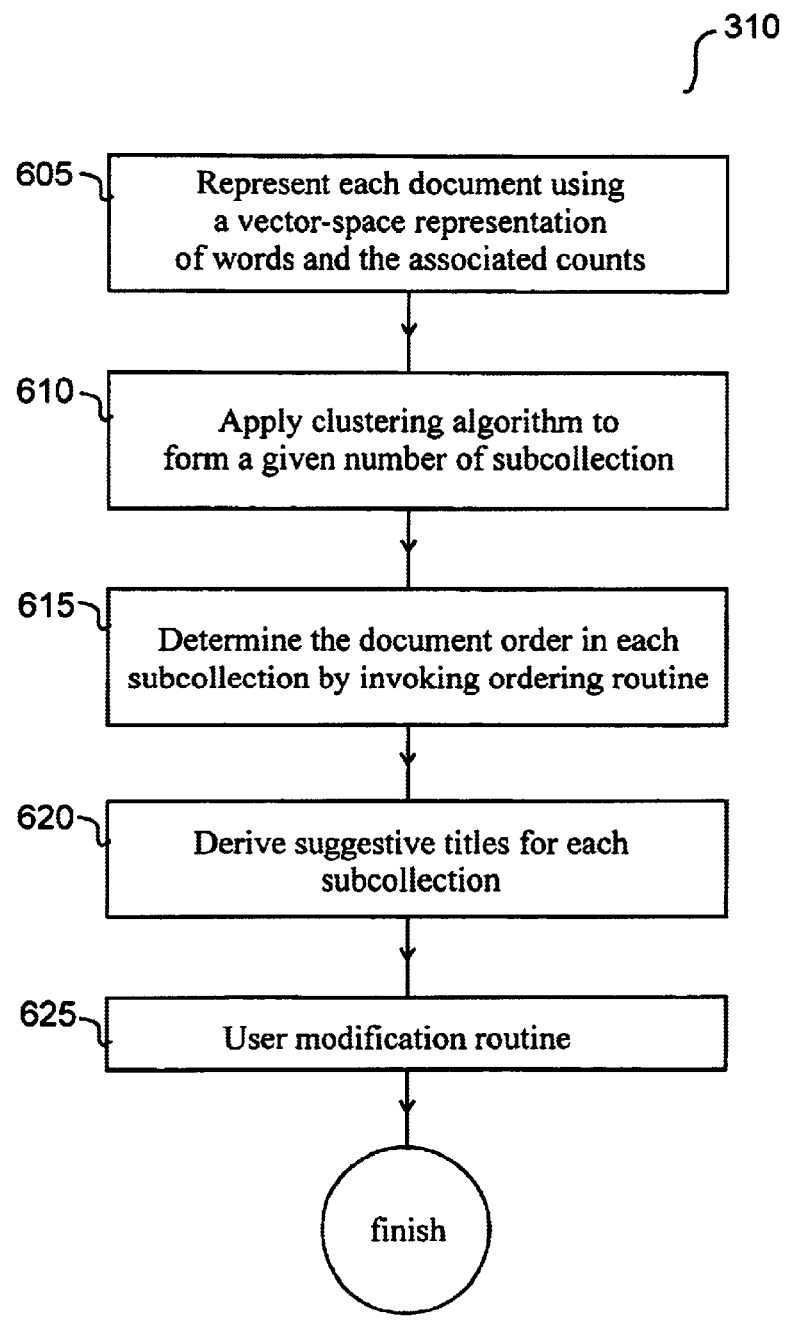
FIG. 6 is a flow chart of an organization routine according to the present invention.

Referring to FIG. 6, the organization routine 265 creates structure for the collection of documents provided by the collection routine 264. In a preferred embodiment a vector space representation is used in which each document is represented as vector of words (e.g., hyperlinks) together with its count or frequency 605. Specifically, each document can be represented as a term vector of the form ($a_1$, $a_2$, ..., $a_n$). Each term, $a_i$, has a word and a weight, $w_i$, associated with it, where $w_i$ denotes the number of occurrences of the word. Alternatively, $w_i$ can denote a function of the number of occurrences, for example, the square root of the number of occurrences. Viewing each word as a dimension and the corresponding count as the coordinate on that dimension, each document is transformed into a point or vector in a high dimensional space of word. A clustering algorithm is applied to these vectors to form a given number of clusters or sub-collections specified by the user 610. There are numerous clustering methods available. See for example, Charu Aggarwal, et al., "Fast Algorithms for Projected Clustering", Proc. 1999 ACM SIGMOD Conference, Philadelphia, Pa., May 1999, pp. 61–72, in which the authors "discuss a generalization of the clustering problem, referred to as the projected clustering problem, in which the subsets of dimensions selected are specific to the clusters themselves." See also, Charu Aggarwal, et al., "On the Merits of Building Categorization Systems by Supervised Clustering", Proc. 1999 ACM SIGKDD Conference, San Diego, Calif., August 1999, pp. 352–356, in this work, the authors discuss "supervised clustering in order to create sets of categories for classification of documents . . . " using "information from a pre-existing taxonomy in order to supervise the creation of a set of related clusters, though with some freedom in defining and creating classes."

The order of each document in the sub-collection is determined by invoking the ordering routine 615. Alternative approaches to the ordering routine 615 are described below with reference to FIGS. 7 and 9. Suggestive titles are derived for each sub-collection 620. Those skilled in the art will appreciate that many alternative implementations exist. In a preferred embodiment, the most frequent occurring words in each sub-collection are used as suggestive titles. The user modification routine can be invoked 625 such that the user can select one of the suggestive titles for the sub-collection or input an alternative title. The user is also presented with the sub-collections, and can modify the composition of each sub-collection or the document order within each sub-collection. According to the present invention a user can annotate the meta-structure in post processing, either in the form of attachable notes, or full fledged introductory (or summary) paragraphs (similar to making a derivative book out of articles, for example, where a guest editor introduces each article and follows up with a summary of subsequent work).

An alternative means for performing in the initial clustering 610 is provided for partitioning the documents into sub-collections. The method can partition the documents by chronological age of the pages, or clustering by URL/domains. Alternatively, the present invention skips clustering and only performs an ordering of the documents. For example, one can exploit the hyperlink structure to perform a breadth-first or depth-first ordering from a seed document (selected based on some user specified criterion or user specification). For example, assume document 1 points to documents 2, 3 and 4, document 2 points to documents 4 and 5, and document 3 points to documents 6 and 7. The breadth-first ordering of the collection is 1, 2, 3, 4, 5, 6 and 7, essentially, as each document is collected. Alternatively, the present invention can implement a depth-first clustering, for example, 1, 2, 4, 5, 3, 6, 7, and 4. According to the depth-first embodiment, the method follows the hyperlinks until it reaches a dead-end (where no additional hyperlinks are found in a document) or some predefined criteria. The method then returns to a higher level and continues collecting documents for the next hyperlink. More elaborate ordering methods are addressed in FIG. 7.

Figure 7:
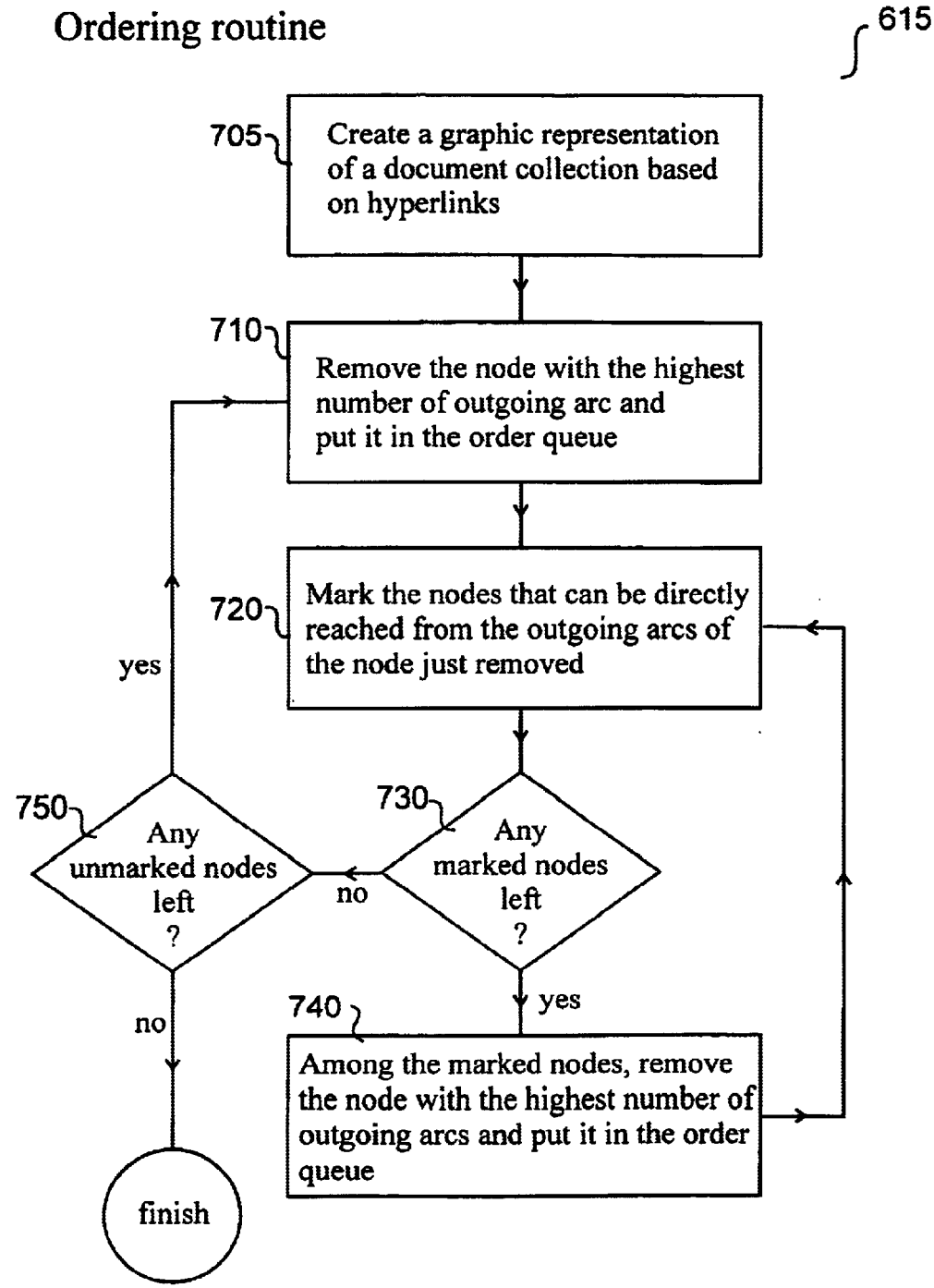
FIG. 7 is a flow chart of a document ordering routine according to the present invention.

Referring to FIG. 7, a directed graph is created to represent a collection or sub-collection of documents 705. This directed graph is a view of the document structure prior to organization. Each document points to another document and/or is pointed to by another document. Each document is represented as a node, and a directed arc from node i to node j is added if the hyperlink (or URL) of document j appears in document i. An order queue is initialized to "empty" and is used to list the documents in order. The node with the highest number of outgoing arcs in the directed graph is removed from the graph and added to the end of the order queue 710. The nodes that can be directly reached from the outgoing arcs of the previously removed node are marked (if they are not yet marked) 720. The method determines whether there are any marked nodes left in the directed graph 730. If so, from the group of marked nodes, the node with the highest number of outgoing arcs is removed from the graph and added to the end of the order queue 740. The method then determines whether there are any unmarked nodes remaining 750. If not, all the nodes are in the order queue which provides the order of the document collection.

Figure 8:
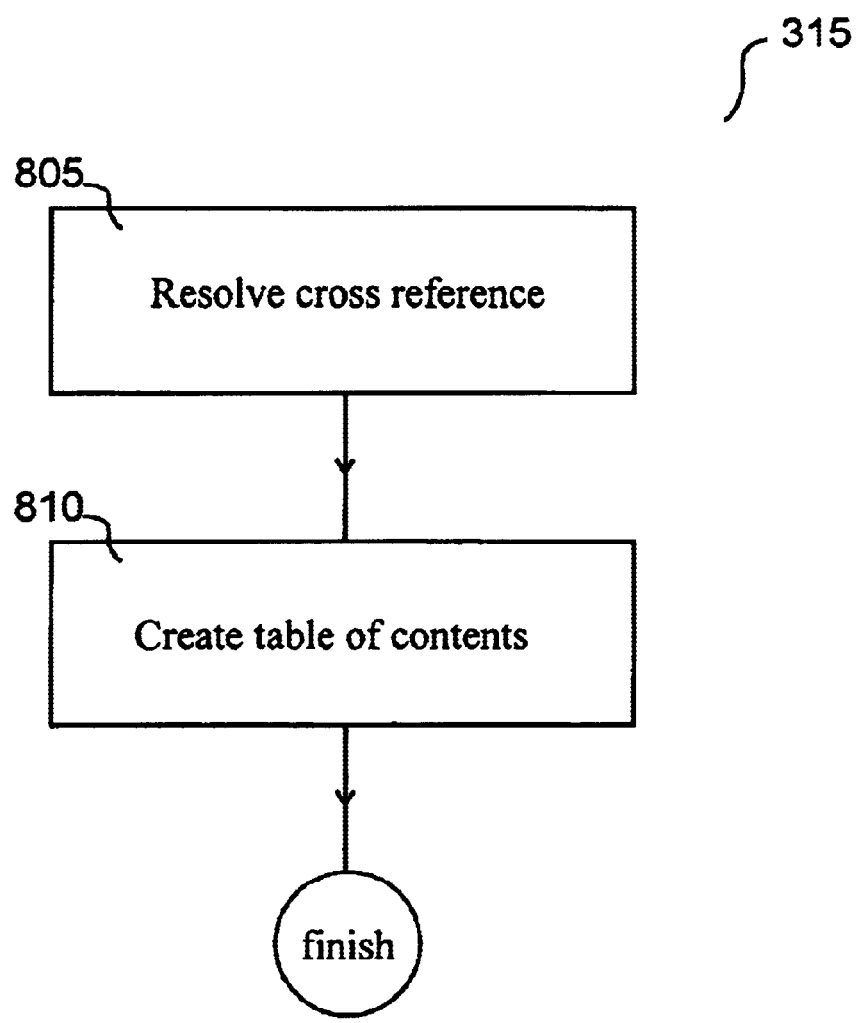
FIG. 8 is a flow chart of an integration routine according to the present invention.

According to an embodiment of the present invention depicted in FIG. 8, the cross references to hyperlinks are resolved in block 805. Within the collection of documents, for each document, all hyperlinks pointing to that document are identified. In a preferred embodiment, a footnote or cross reference is added to the hyperlinks. The footnote points to the corresponding documents by page, section, and chapter number. A table of contents is created for a collection in block 810. Other features such as index, table of contents, tables and/or figures, summary of hyperlinks, and glossary can also be added based on user needs or preferences.

Figure 9:
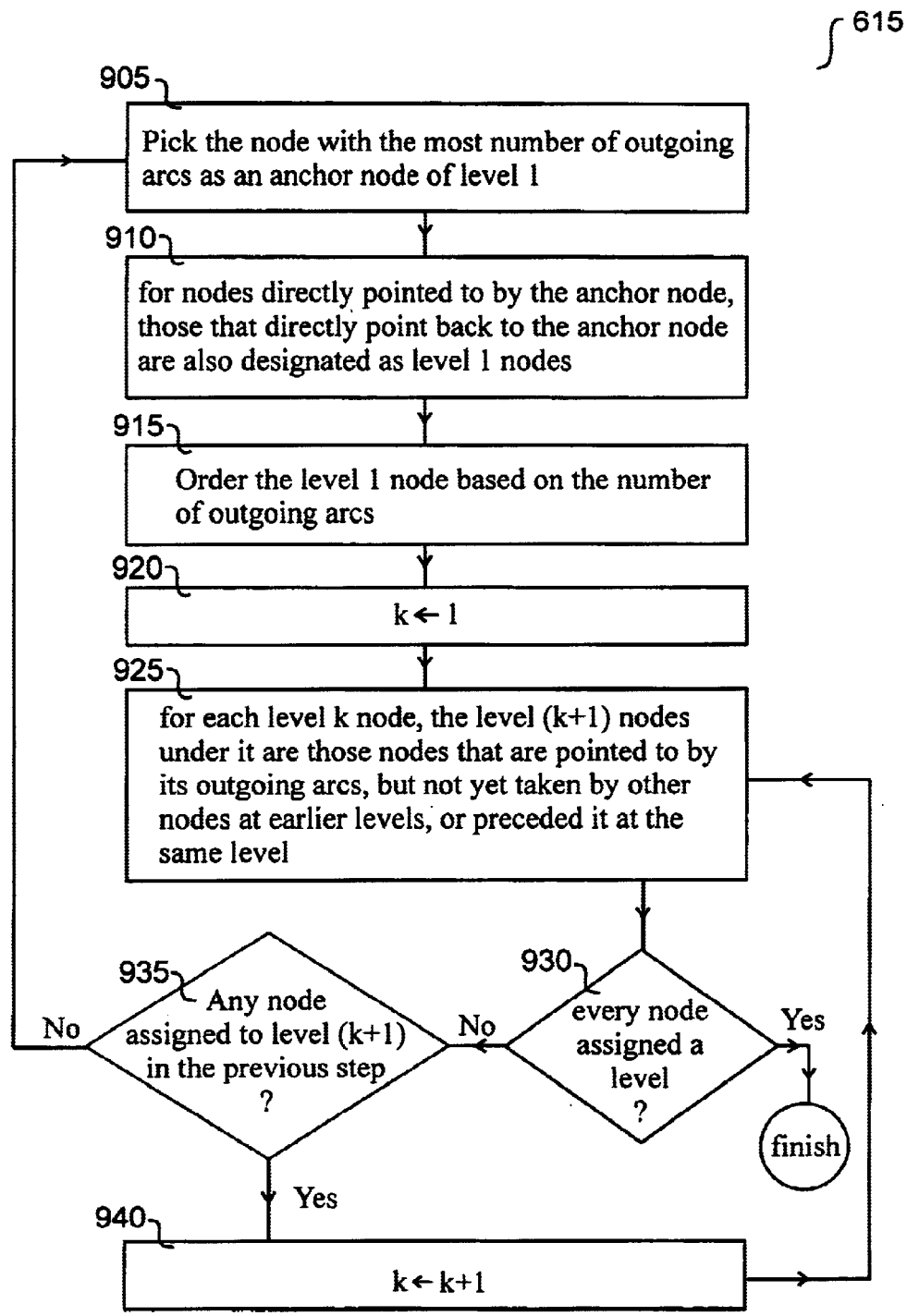
FIG. 9 is a flow chart of a hierarchical structure routine according to the present invention.

In addition, the present invention contemplates alternative implementations for creating a sub-collection, for example, a user can repeat the clustering method depicted in FIG. 6 to each sub-collection recursively to create a hierarchy of sub-collection. Alternatively, the hyperlink structure can be explored to create a hierarchical sub-collection as shown in FIG. 9. As in FIG. 7, the direct graph representation of the document collection is used as a base for creating the sub-collection. Also, as in FIG. 7, each document is represented as a node. From a directed graph representation of the document collection, the node with the most outgoing arcs from the directed graph representation of the document collection is selected as the anchor node of level 1 of the hierarchical document organization 905. Among the nodes directly pointed to by the anchor node, those with an outgoing arc that directly points back to the anchor node are also designated as level 1 nodes 910. The level 1 nodes are ordered according to the number of outgoing links from each node 915 (i.e., nodes with a higher number will be ranked higher). k, a counter, is set to 1 in block 920. For each level k node, the level k+1 nodes under it are those nodes pointed to by level k's outgoing arcs, but not yet assigned to other nodes at earlier levels or nodes preceding it at the same level k, in block 925. The method determines whether every node has been assigned a level 930. If so, the routine is completed. Otherwise, the method determines whether there is any node assigned to level k+1 in the last invocation of block 925, in block 935. If not, those parts (documents) of the directed graph is not reachable from the anchor node (or nodes) identified so far. Block 905 is repeated again to select another anchor node from the remaining unassigned portions of the graph. k is incremented by one in block 940.

As most information is now available on the Internet in the form of Web pages or hyperlinked documents, the present invention provides a system and method for developing detailed comprehensive, and integrated publications from at least one initial seed hyperlinked document. A publishing and distribution service is provided. This service provides a model for a printing house. Additional services are provided, such as resolving copyright issues with each document source on behalf of the user. Also contemplated is a method of providing packaging, distribution, and/or delivery services. The distribution and delivery services can be either in hard copy or printable soft copy. The user can alter the document collection (as in the user interaction routine (415) in FIG. 4) or modify the chapter or section title of the composition (as in the user modification routine 625 in FIG. 6) through, for example, a Web browser interface or word processor application at a client work station.

Those skilled in art can see that various additional services can be included. For example, the present invention can include tracking/delivery services for the documents, either through a "return receipt" protocol (similar to that available for e-mail such as LOTUS NOTES) or use of a tracking system (such as that used by FEDERAL EXPRESS) for the delivery/tracking of physically printed documents. The present invention also allows for (1) publishing (on paper or in other media) locally, followed by shipping, or (2) remotely publishing/printing at a location near the end user where the customer can pick up the document directly.

In an embodiment of the present invention a publishing method provides for collection and distribution of royalties to authors of the components (i.e., collected documents) of the integrated document based on the number of copies printed.

Having described embodiments of a system and method for creating a unified printable collection of hyperlink documents, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

What is claimed is:

1. A computer-implemented method for creating a meta-document comprising the steps of:
    collecting at least one hyperlinked document based on a seed document, the seed document comprising at least one hyperlink to the at least one hyperlinked document;
    organizing the collected document and the seed document comprising
        defining a document with the largest number of connections as an anchor of a first level,
        defining any document pointed to by the anchor and pointing back to the anchor as a first level node,
        ordering the first level nodes based on the number of nodes each first level node points to,
        defining at least a second level including documents pointed to by the first level and not yet pointed to by another node,
        completing the organization upon determining that all documents are assigned a level,
        defining a document with the largest number of connections as an anchor of a first level upon determining that no document was assigned to last defined level, and
        defining an additional level including documents pointed to by a next higher level and not yet pointed to by another node upon determining that a document was assigned to last defined level;
    resolving an anchor in the seed document and an object in the at least one hyperlinked document;
    referencing the anchor and the object based on respective locations within a meta-document, wherein the meta-document is a collection of the seed document and the at least one hyperlinked document; and
    publishing the meta-document.

2. The method of claim 1, wherein the step of collecting further comprises the steps of:
    accepting the seed document having the anchor pointing to the object; and
    adding a document including the object to the collection.

3. The method of claim 2, further comprising the step of manually modifying the collection.

4. The method of claim 1, wherein the referencing step includes providing one of a footnote, an end note, a table of contents, and an appendix to one of the anchor and the object.

5. The method of claim 1, further comprising the steps of:
    representing the at least one hyperlink as a dimension of a corresponding document;
    determining a frequency of the at least one hyperlink;
    defining hyperlink frequency as a coordinate on a corresponding hyperlink dimension; and
    clustering each document as a vector.

6. The method of claim 1, further comprising the step of ordering the collection breadth-first.

7. The method of claim 1, further comprising the step of ordering the collection depth-first.

8. The method of claim 1, wherein the step of publishing includes one of, printing, storing, faxing, and e-mailing.

9. The method of claim 1, further comprising:
organizing the at least one hyperlinked document into at least one sub-collection; and
determining a title for each sub-collection accordingly to words occurring in the respective sub-collection, wherein the meta-document is a collection of the seed document and the at least one sub-collection.

10. A computer program product comprising:
a computer usable medium having computer readable program code embodied therein for creating a meta-document, the computer readable program code in the computer program product comprising:
computer readable program code for collecting at least one hyperlinked document based on a seed document, the seed document comprising at least one hyperlink to the at least one hyperlinked document;
computer readable program code for organizing the collected document and the seed document comprising
  computer readable program code for defining a document with the largest number of connections as an anchor of a first level,
  computer readable program code for defining any document pointed to by the anchor and pointing to the anchor as a first level node,
  computer readable program code for ordering the first level nodes based on the number of nodes each first level node points to; computer readable program code for defining at least a second level including documents pointed to by the first level and not yet pointed to by another node,
  computer readable program code for completing the organization upon determining that all documents are assigned a level,
  computer readable program code for defining a document with the largest number of connections as an anchor of a first level upon determining that no document was assigned to last defined level, and
  computer readable program code for defining an additional level including documents pointed to by a next higher level and not pointed to by another node upon determining that a document was assigned to last defined level;
computer readable program code for resolving an anchor and an object in the at least one hyperlinked document;
computer readable program code for referencing the anchor and the object based on respective locations within the meta-document, wherein the meta-document is a collection of the seed document and the at least one hyperlinked document; and
computer readable program code for publishing the meta-document.

11. The computer program product of claim 10, wherein the computer readable program code for of collecting further comprises:
computer readable program code for accepting the seed document having the anchor pointing to the object; and
computer readable program code for adding a document including the object to the collection.

12. The computer program product of claim 10, wherein referencing includes providing one of a footnote, an end note, a table of contents, and an appendix to one of the anchor and the object.

13. The computer program product of claim 10, further comprising:
computer readable program code for representing the at least one hyperlink as a dimension of a corresponding document;
computer readable program code for determining a frequency of the at least one hyperlink;
computer readable program code for defining hyperlink frequency as a coordinate on a corresponding hyperlink dimension; and
computer readable program code for clustering each document as a vector.

14. The computer program product of claim 10, further comprising computer readable program code for ordering the collection breadth-first.

15. We computer program product of claim 10, further comprising computer readable program code for ordering the collection depth-first.

16. The computer program product claim 10, wherein publishing includes one of, printing, faxing, and e-mailing.

17. The computer program product of claim 10, further comprising:
computer readable program code for organizing the at least one hyperlinked document into at least one sub-collection; and
computer readable program code for determining a title for each sub-collection accordingly to words occurring in the respective sub-collection, wherein the meta-document is a collection of the seed document and the at least one sub-collection.

* * * * *